(12) United States Patent
Inman et al.

(10) Patent No.: US 11,380,449 B2
(45) Date of Patent: Jul. 5, 2022

(54) CONTROL DRUM SYSTEM FOR USE WITH NUCLEAR REACTORS

(71) Applicant: BWXT Advanced Technologies LLC, Lynchburg, VA (US)

(72) Inventors: James B. Inman, Forest, VA (US); Scott J. Shargots, Forest, VA (US); Gary W. Neeley, Queenstown, MD (US)

(73) Assignee: BWXT Advanced Technologies LLC, Lynchburg, VA (US)

( * ) Notice: Subject to any disclaimer, the term of this patent is extended or adjusted under 35 U.S.C. 154(b) by 0 days.

(21) Appl. No.: 17/024,051

(22) Filed: Sep. 17, 2020

(65) Prior Publication Data

US 2021/0082587 A1 Mar. 18, 2021

Related U.S. Application Data

(60) Provisional application No. 62/901,571, filed on Sep. 17, 2019.

(51) Int. Cl.
*G21C 7/28* (2006.01)
*G21C 7/14* (2006.01)
*F16H 13/06* (2006.01)
*F16H 3/44* (2006.01)
*G21D 5/02* (2006.01)
*F16H 1/32* (2006.01)

(52) U.S. Cl.
CPC ............... *G21C 7/28* (2013.01); *F16H 3/44* (2013.01); *F16H 13/06* (2013.01); *G21C 7/14* (2013.01); *F16H 2001/327* (2013.01); *G21D 5/02* (2013.01)

(58) Field of Classification Search
CPC ........ G21C 17/12; G21C 17/14; G21C 17/16; G21C 17/18; G21C 17/28; G21D 5/02; F16H 2025/2087; F16H 13/06; F16H 3/44; F16H 2001/327
See application file for complete search history.

(56) References Cited

U.S. PATENT DOCUMENTS 2,881,619 A    4/1959   Fox
3,049,483 A * 8/1962   Kesselring ............... G21C 1/02
                                                       376/223

(Continued)

OTHER PUBLICATIONS

International Search Report and Written Opinion, PCT/US2020/051248, dated Feb. 8, 2021, 9 pages.

*Primary Examiner* — Jack W Keith
*Assistant Examiner* — Joshua C Devorkin
(74) *Attorney, Agent, or Firm* — Nelson Mullins Riley & Scarborough LLP (57) ABSTRACT

A control drum system for a nuclear reactor including a reactor core, including an ex-core reflector including a plurality of cylindrical apertures, a plurality of control drum assemblies, each control drum assembly including a drive shaft, a drum cylinder affixed to a bottom end of the drive shaft, and a planetary gear attached to a top end of the drive shaft, wherein each drum cylinder is rotatably received in a cylindrical aperture, a first control drum drive motor operably connected to a first control drum assembly, and an annular ring gear that is operably connected to the planetary gear of each of the control drum assemblies so that all the control drum assemblies rotate simultaneously.

10 Claims, 9 Drawing Sheets

(56) References Cited

U.S. PATENT DOCUMENTS

| | | |
|---|---|---|
| 3,575,805 A | 4/1971 | Dempsey |
| 5,410,578 A | 4/1995 | Walton |
| 6,229,867 B1 | 5/2001 | Kobsa |
| 2006/0035739 A1* | 2/2006 | Osborn .................... F16H 1/34 |
| | | 474/155 |
| 2015/0357056 A1 | 12/2015 | Shayer |

* cited by examiner

CONTROL DRUM SYSTEM FOR USE WITH NUCLEAR REACTORS

CLAIM OF PRIORITY

This application claims priority to U.S. provisional patent application No. 62/901,571 filed Sep. 17, 2019, the disclosure of which is incorporated by reference herein.

TECHNICAL FIELD

The presently-disclosed invention relates generally to systems and methods of use thereof for controlling reactor power levels in nuclear reactors and, more specifically, to systems and methods of use thereof for controlling the operation of multiple control drums for nuclear thermal propulsion space reactors.

BACKGROUND

Figure 1:
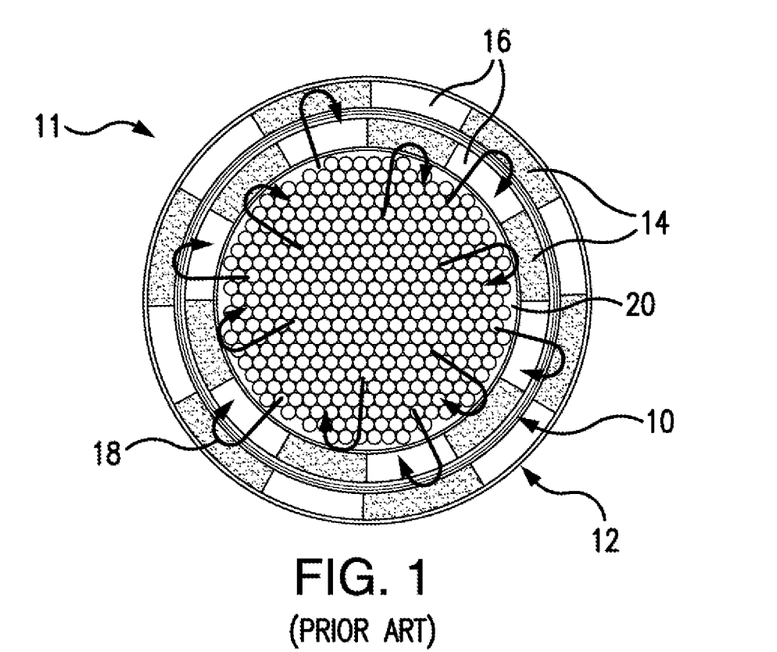
FIG. 1 is cross-sectional view of ex-core control barrels of a prior art nuclear thermal propulsion space reactor.

The reactivity of nuclear reactors, specifically nuclear thermal space reactors, may be controlled by various techniques, such as core barrels and control drums, in-core control rods, movable fuel and reflector segments, burnable poisons and poisons that are dispersed in the core. The majority of space nuclear reactors use ex-core control systems. The present disclosure pertains to the ex-core reactor control systems, specifically control drums Space nuclear reactors are controlled by the amount of neutrons reflected back into the reactor core in order to either increase or decrease the neutron flux, the number of neutrons that split further uranium atoms. Ex-core reactor controllers are either a form of control drums or control barrels. Ex-core control barrels control the reactor's criticality by the amount of neutrons that are reflected back into the reactor core to fission the uranium atoms. As shown in FIG. 1, the basic rotating control barrel design consists of an inner stationary barrel 10 and an outer rotating barrel 12. Both barrels 10 and 12 contain both reflector material segments 14 and open segments 16. As shown, the inner barrel 10 is the stationary barrel and the outer barrel 12 rotates. The outer control barrel 12 in FIG. 1 is in the full "on" position such that the reflecting material segments 14 in the outer barrel overlap, or block, the open segments 16 of the inner barrel 10 in order to reflect all the neutrons (arrows 18) back into the core 20.

Figure 2:
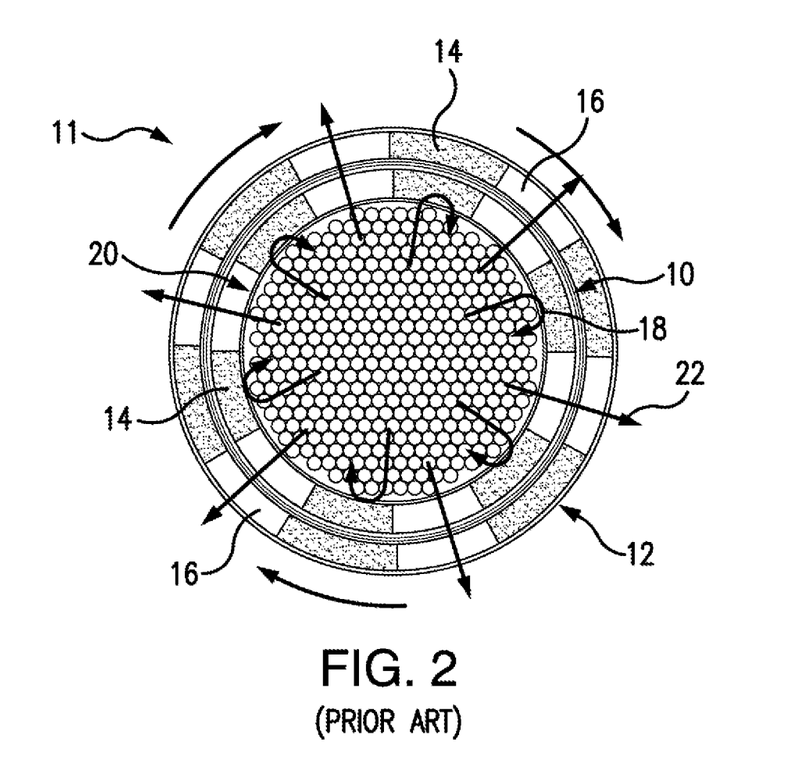
FIG. 2 is a cross-sectional view of the prior art ex-core control barrels shown in FIG. 1.

To shut down the nuclear reactor 11, the outer control barrel 12 is rotated to the full "off" position such that the outer barrel's reflector segments 14 are aligned with the stationary inner barrel's reflector segments 14, while both the inner and outer barrel 10 and 12, respectively, open segments 16 are aligned. By aligning the open segments 16, more neutrons escape (arrows 22) than are required to keep the reactor core 20 critical, thus shutting down the reactor 11. Reactor power control is accomplished by positioning the outer barrel reflector segments 14 between the full on position shown in FIG. 1 and the shutdown position shown in FIG. 2.

Figure 3:
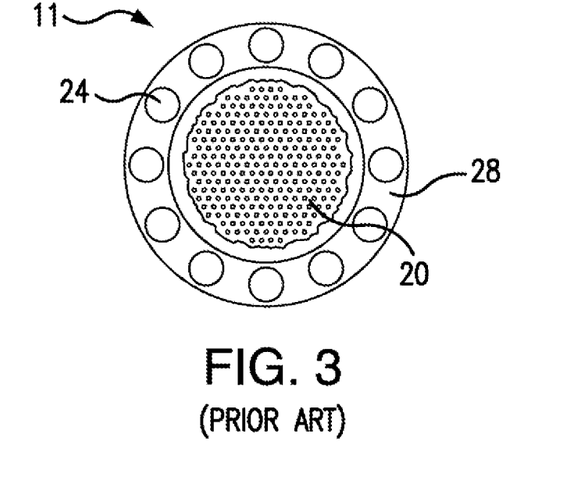
FIG. 3 is a cross-sectional view of prior art ex-core control drums of a prior art nuclear thermal propulsion space reactor.
Figure 4:
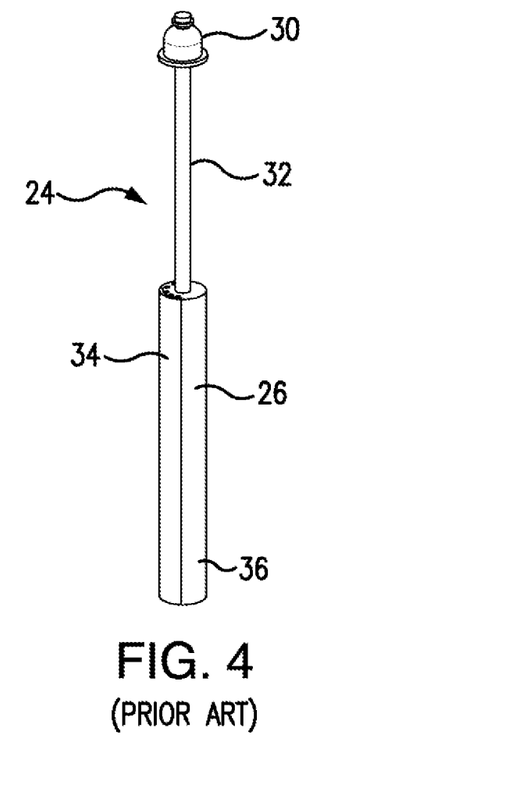
FIG. 4 is a perspective view of a prior art control drum assembly as shown in FIG. 3.
Figure 5:
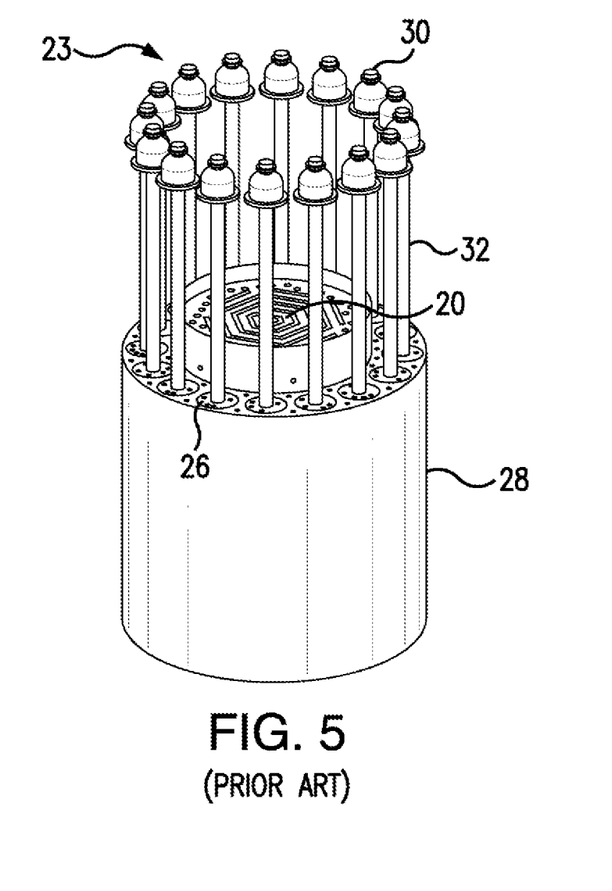
FIG. 5 is a perspective view of a rotating control drum assembly of a prior art nuclear thermal propulsion space reactor.

In yet another ex-core control system, rotating control drums assemblies 24 surround the reactor core 20 and consist of rotating drum cylinders 26 inserted within the ex-core radial reflector 28, as shown in FIGS. 3 through 5. As shown, each control drum assembly 24 includes a control drum cylinder 26 that is driven by way of a drive shaft 32 by its own individual control drum drive motor (CDDM) 30. The control drum cylinder 26 is made of the same material as the radial reflector 28 material with a section of absorber material 34 (or neutron poison) that consists of neutron absorbing material. Each drive shaft 32 connects a drum cylinder 26 to the corresponding CDDM 30. Each CDDM 30, which positions the corresponding drum cylinder 26, can be powered either electrically, hydraulically or with pneumatics.

Figure 6:
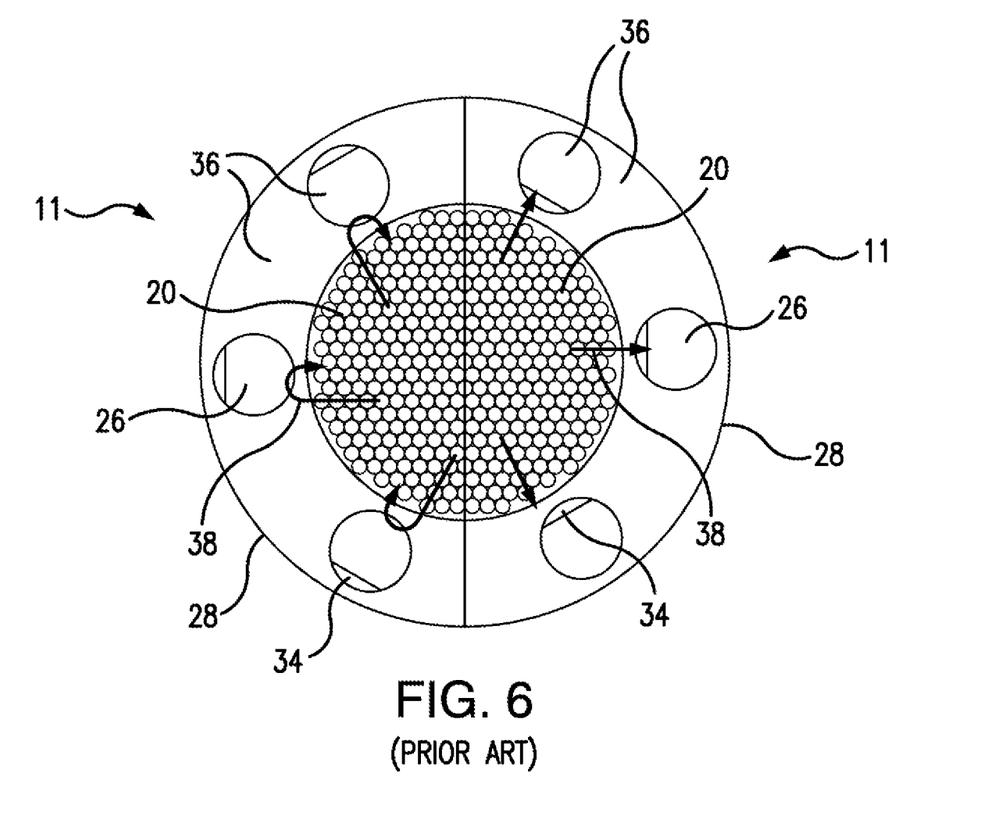
FIG. 6 is a cross-sectional view of a rotating control drum system of a prior art nuclear thermal propulsion space reactor.

Referring now to the left-hand side of FIG. 6, during normal reactor operation conditions, the control drums cylinders 26 are positioned such that the reflecting material 36 is pointing toward the core 20, thereby directing the neutrons 38 back into the reactor core 20 (left side of FIG. 6). During shutdown, each control drum cylinder 26 is rotated so that the neutron absorbing material 34 is pointing toward the core 20, thereby absorbing enough neutrons 38 to shut down the nuclear reactor 11, as shown on the right side of FIG. 6.

Figure 7:
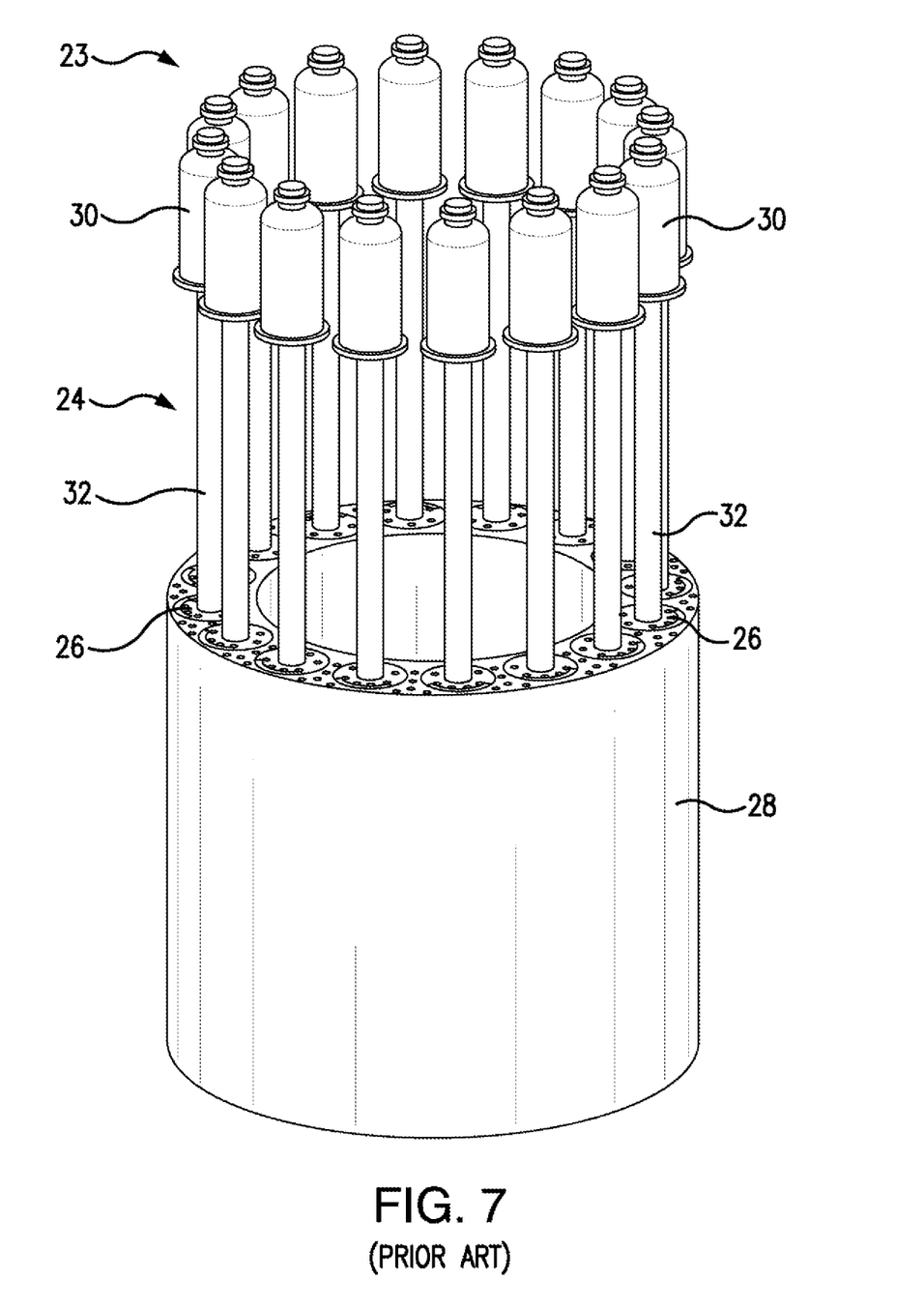
FIG. 7 is a perspective view of a rotating control drum system of a prior art nuclear thermal propulsion space reactor, wherein each control drum assembly has an individual control drum drive motor.

Referring additionally to FIG. 7, in known systems, each control drum cylinder 26 is controlled by its own CDDM 30. As expected, the use of an independent CDDM 30 for each control drum cylinder 26 increases the chances for the failure of a sole CDDM 30, and the subsequent inability to operate the corresponding control drum cylinder 26. The present disclosure pertains to eliminating the requirement of having an individual CDDM 30 for each control drum.

As such, there at least remains a need, therefore, for systems and methods for controlling reactor power levels in nuclear space reactors, to include nuclear thermal space reactors.

SUMMARY OF INVENTION

One embodiment of the present disclosure provides a control drum system for a nuclear reactor including a reactor core, comprising an ex-core reflector including a cylindrical outer wall, a cylindrical inner wall that is concentric with the outer wall and defines a cylindrical center bore, and a plurality of cylindrical apertures disposed between the outer and inner walls, a plurality of control drum assemblies, each control drum assembly including a drive shaft having a top end and a bottom end, a drum cylinder affixed to the bottom end of the drive shaft, and a planetary gear attached to the top end of the drive shaft, wherein the drum cylinder of each control drum assembly is rotatably received in a corresponding cylindrical aperture of the ex-core reflector, a first control drum drive motor operably connected to the top end of the first control drum assembly of the plurality of the control drum assemblies so that the first control drum motor rotates the drum cylinder of the first control drum assembly within the corresponding cylindrical aperture of the ex-core reflector, and an annular ring gear that is operably connected to the planetary gear of each of the control drum assemblies so that all the control drum assemblies rotate simultaneously.

Another embodiment of the present disclosure provides a nuclear reactor having a reactor core, an ex-core reflector including a cylindrical outer wall, a cylindrical inner wall that is concentric with the outer wall and defines a cylindrical center bore, and a plurality of cylindrical apertures disposed between the outer and inner walls, the reactor core being disposed within the center bore, a plurality of control drum assemblies, each control drum assembly including a drive shaft having a top end and a bottom end, a drum cylinder affixed to the bottom end of the drive shaft, and a planetary gear attached to the top end of the drive shaft, wherein the drum cylinder of each control drum assembly is rotatably received in a corresponding cylindrical aperture of the ex-core reflector, a first control drum drive motor operably connected to the top end of a first control drum assembly of the plurality of the control drum assemblies so that the first control drum motor rotates the drum cylinder of the first control drum assembly within the corresponding cylindrical aperture of the ex-core reflector, and a synchronizing element that is operably connected to the planetary gear of each of the control drum assemblies so that all the control drum assemblies rotate simultaneously.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

The invention now will be described more fully hereinafter with reference to the accompanying drawings, in which some, but not, all embodiments of the invention are shown. Indeed, this invention may be embodied in many different forms and should not be construed as limited to the embodiments set forth herein; rather, these embodiments are provided so that this disclosure will satisfy applicable legal requirements.

Repeat use of reference characters in the present specification and drawings is intended to represent same or analogous features or elements of the invention according to the disclosure.

DESCRIPTION OF THE PREFERRED EMBODIMENTS

Reference will now be made to presently preferred embodiments of the invention, one or more examples of which are illustrated in the accompanying drawings. Each example is provided by way of explanation, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, terms referring to a direction or a position relative to the orientation of the fuel-fired heating appliance, such as but not limited to "vertical," "horizontal," "upper," "lower," "above," or "below," refer to directions and relative positions with respect to the appliance's orientation in its normal intended operation, as indicated in the Figures herein. Thus, for instance, the terms "vertical" and "upper" refer to the vertical direction and relative upper position in the perspectives of the Figures and should be understood in that context, even with respect to an appliance that may be disposed in a different orientation.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provided illustrative examples for the terms. The meaning of "a," "an," and "the" may include plural references, and the meaning of "in" may include "in" and "on." The phrase "in one embodiment," as used herein does not necessarily refer to the same embodiment, although it may.

Figure 8:
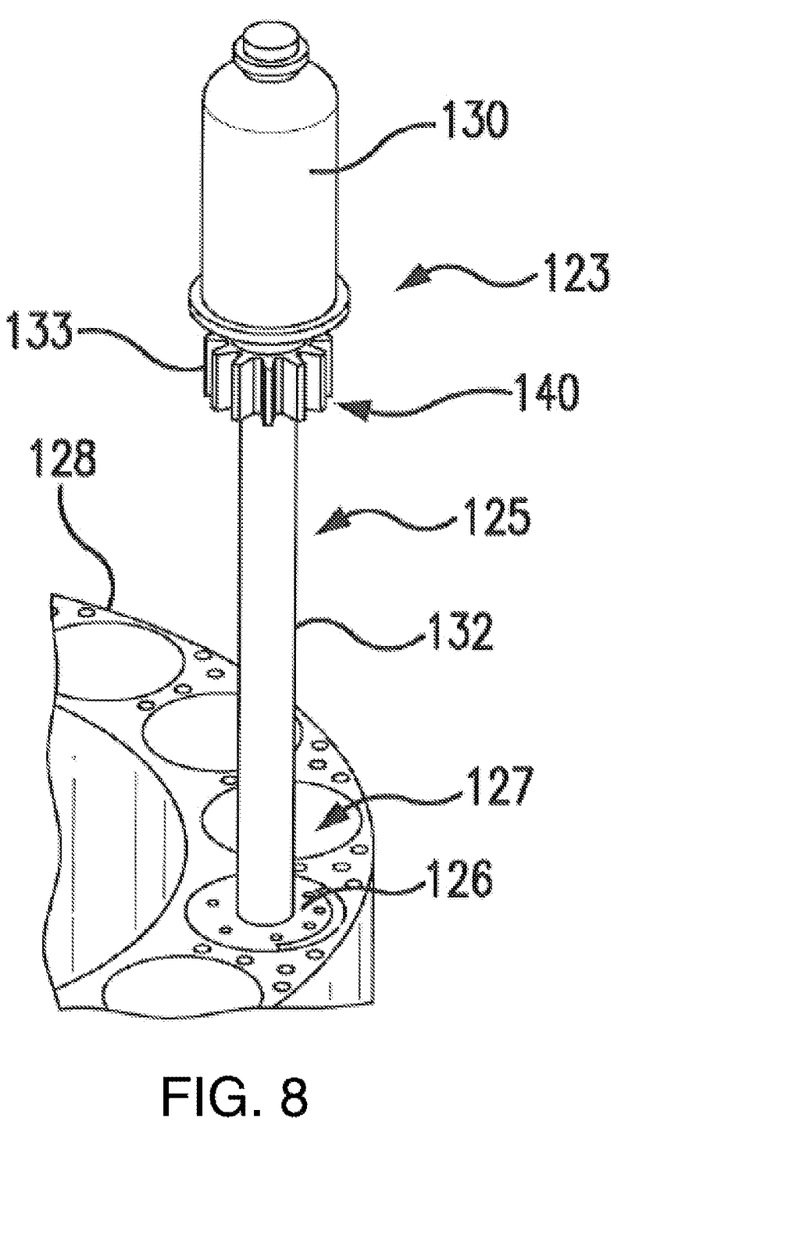
FIG. 8 is a perspective view of a control drum system in accordance with an embodiment of the present invention.
Figure 9:
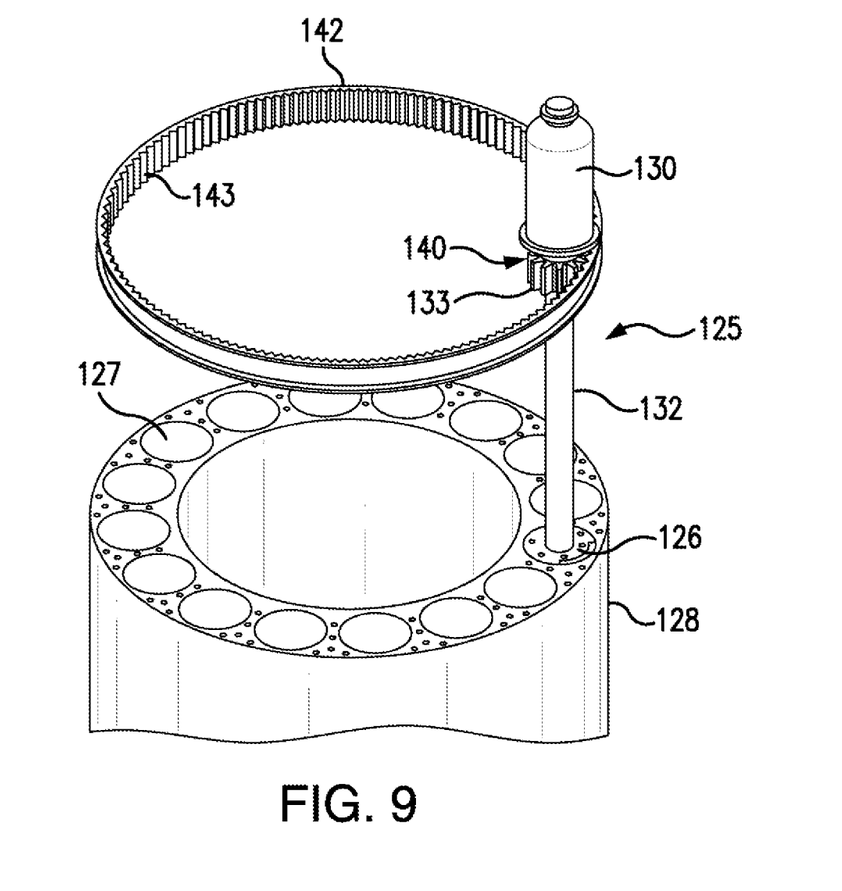
FIG. 9 is a perspective view of a ring gear of a control drum drive system in accordance with an embodiment of the present invention.
Figure 10:
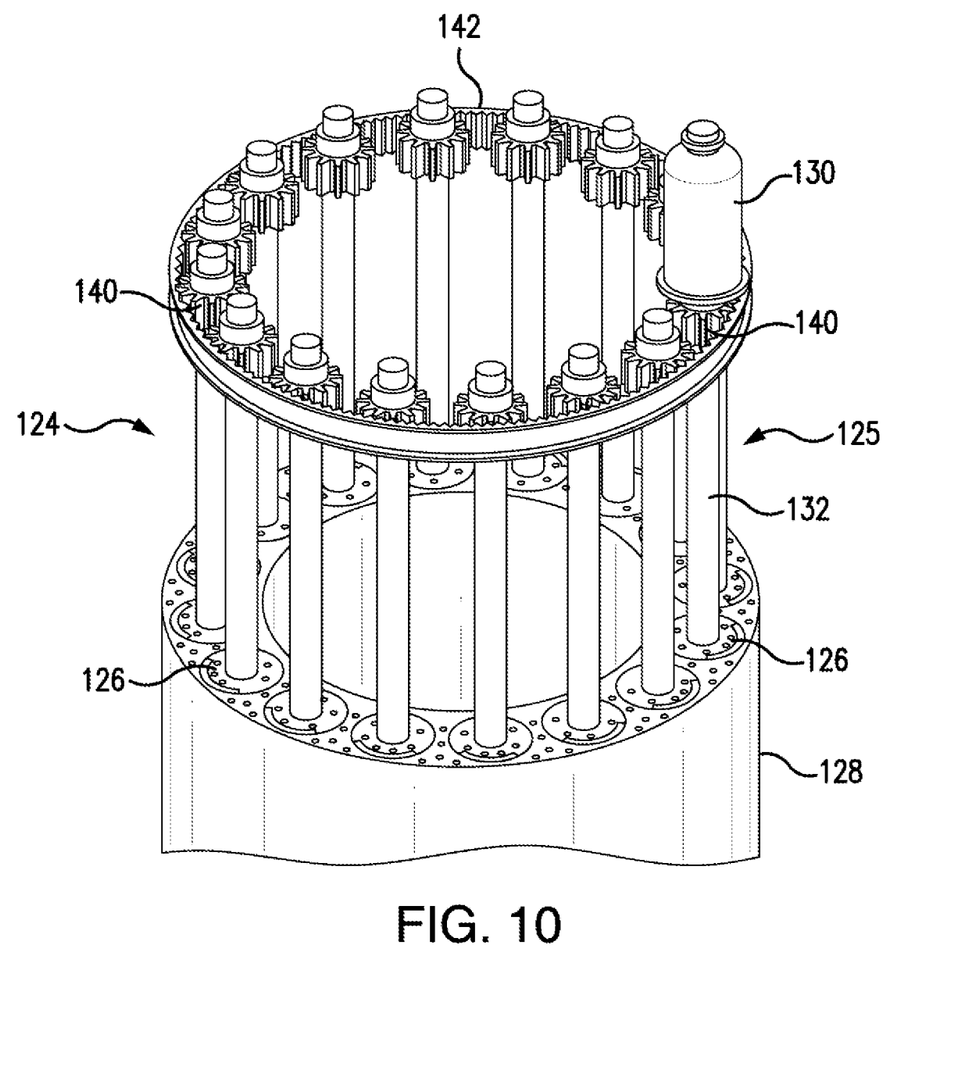
FIG. 10 is a perspective view of a control drum drive system in accordance with an embodiment of the present invention.

Referring now to FIGS. 8 through 10, a control drum system 123 in accordance with an embodiment of the present invention includes a plurality of control drum assemblies 124, 125, each of which includes a driveshaft 132 that is affixed to a corresponding drum cylinder 126, each drum cylinder 126 being rotationally received in a corresponding cylindrical aperture 127 formed in an ex-core radial reflector 128 of the control drum system 123. As shown, each control drum assembly 124 also includes a planetary gear 140 affixed to an upper end of the drive shaft 132 opposite the drum cylinder 126.

The planetary gear 140 of each control drum assembly 124 includes a plurality of gear teeth 133 that is rotationally engaged to a corresponding set of gear teeth 143 that are formed on an inner wall of a synchronizing element, such as an annular ring gear 142 of the control drum system 123, so that all of the control drum assemblies 124 rotate in unison. As shown, the ring gear 143 surrounds the set of planetary gears 143. However, in alternate embodiments, the gear teeth 143 may be formed on the outer wall of the ring gear 142, and the ring gear 142 may be positioned radially inwardly of the set of planetary gears 140. As an alternate to a ring gear, a chain or cogged belt may be used to connect all control drums to a single planetary gear. Note, unlike the previously discussed prior art control drum systems 23 in which each control drum assembly 24 includes a corresponding control drum drive motor 30 (FIG. 7), the planetary gears 140 and ring gear 142 configuration of the present control drum system 123 allows all of the control drum assemblies 124 to be rotated in unison by a single control drum drive motor 130 that is operably engaged to a single one of the control drum assemblies 124, as shown in FIG. 10.

Figures 11, 12:
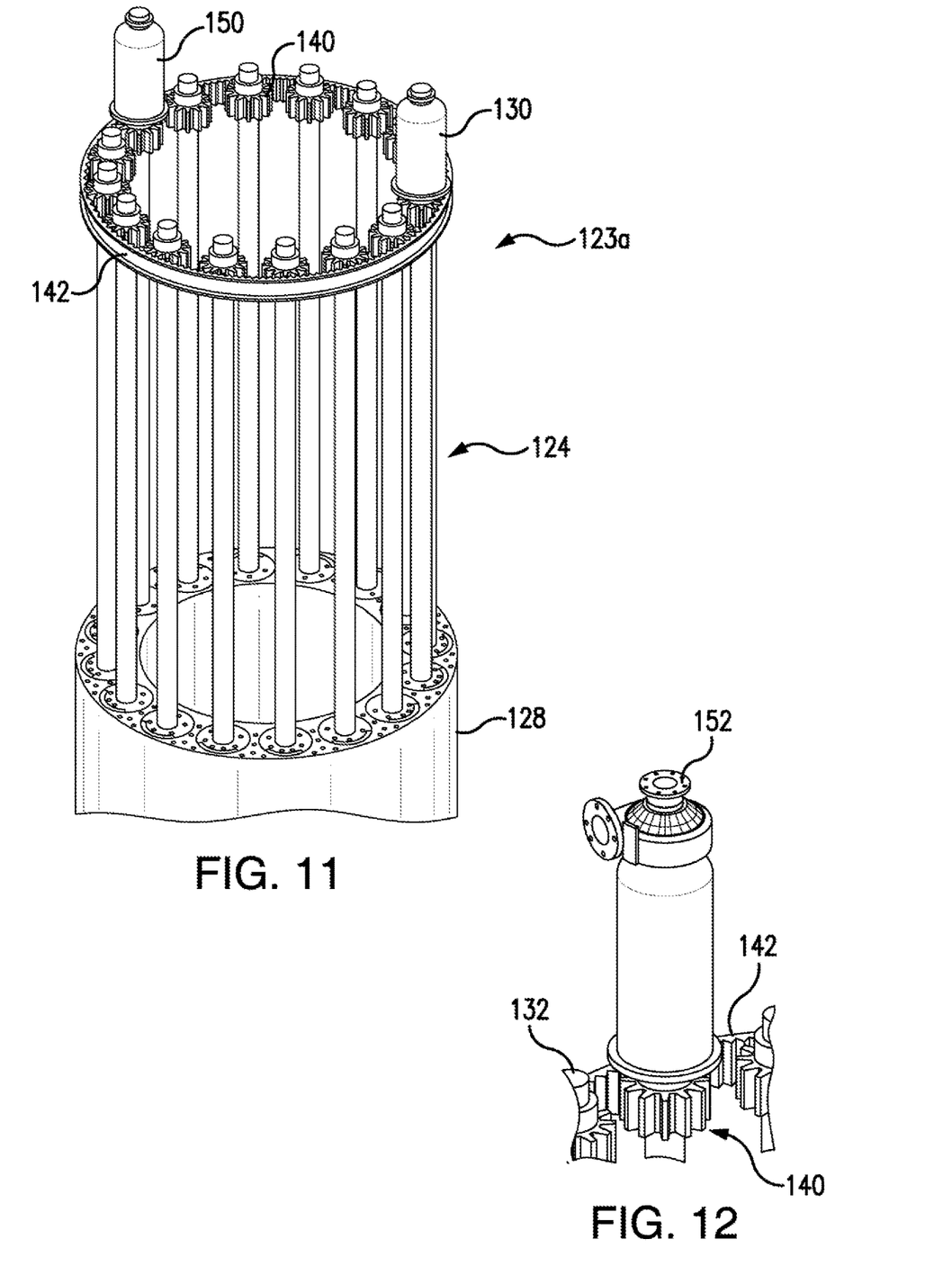
FIG. 11 is a perspective view of a back-up control drum drive motor in accordance with an alternate embodiment of the present invention.
FIG. 12 is a perspective view of a pneumatically-driven control drum drive motor in accordance with an alternate embodiment of the present invention.
Figure 13:
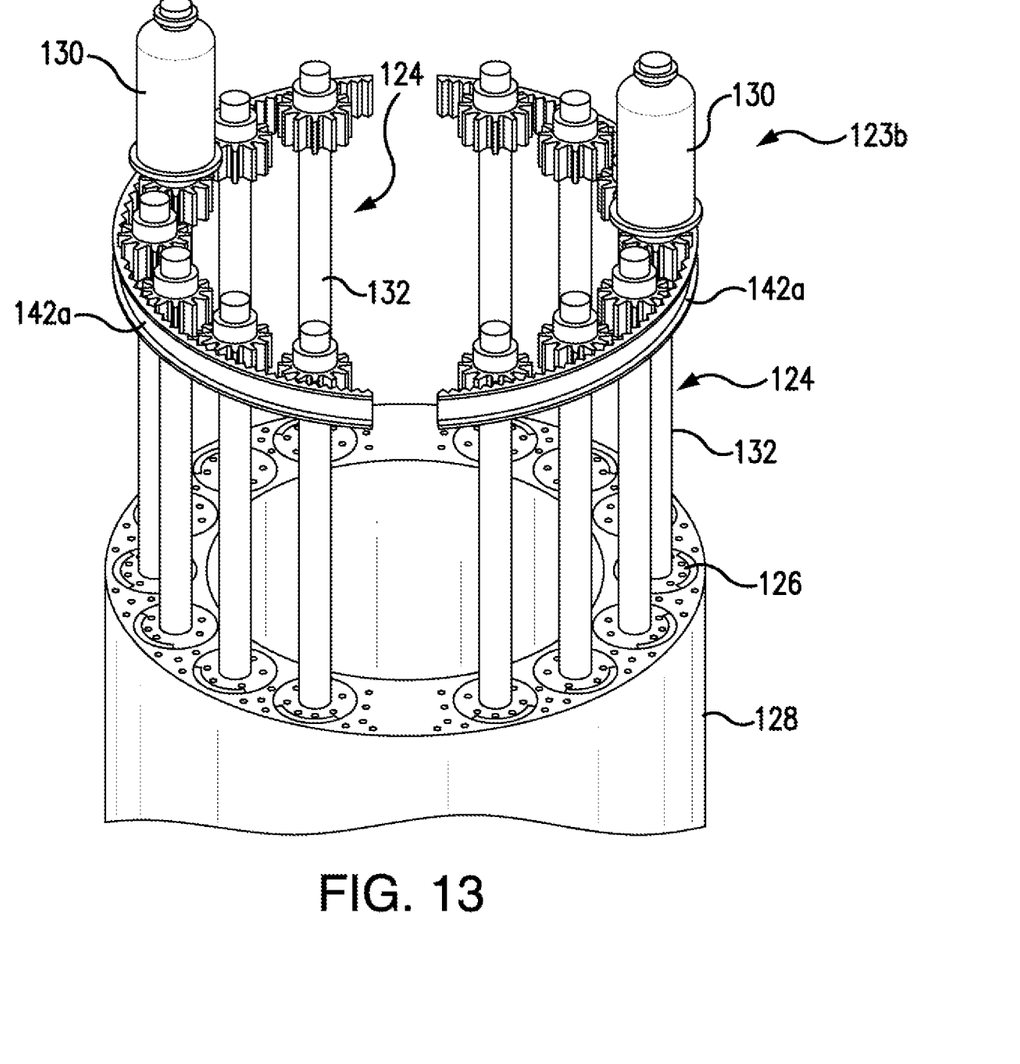
FIG. 13 is a perspective view of an alternate embodiment of a control drum drive system in accordance with an alternate embodiment of the present invention.

Referring now to FIG. 11, an alternate embodiment of a control drum system 123a in accordance with the present invention includes a backup control drum drive motor 150 in addition to the primary control drum drive motor 130, as previously discussed with regard to the embodiment shown in FIGS. 8 through 10. The backup control drum drive motor 150 allows the plurality of control drum assemblies 124 to be rotated in unison even if one of the two control drum drive motors 130 and 150 fails to operate. As shown in FIG. 12, in yet another embodiment of the present invention, a pneumatically-driven control drum drive motor 152 may be used in place of, or in combination with, the previously discussed electric control drum drive motors 130 and 150. As shown in FIG. 13, in yet another embodiment of a control drum system 123b in accordance with the present invention, a divided gear ring 142a may be used rather than the previously discussed unitary ring gear 142 (FIGS. 9 and 10). As shown, the divided gear ring 142a portions allow the plurality of control drum assemblies 124, there being sixteen in the present example, to be controlled independently in banks of eight control drum assemblies 124. Note, in alternate embodiments, the divided ring gear may have a greater number of portions than two, provided that one of the control drum assemblies 124 that corresponds to each portion of the divided ring gear includes a control drum drive motor 130. Each portion of the divided ring gear may be operated in unison, or simultaneously, with the other portions of the divided ring gear, or they may be operated independently of each other. Embodiments of the disclosed control drum systems are operable with reactors having various dispositions, i.e., either disposed vertically or horizontally. When used with horizontally disposed reactors, additional bearings may be provided to support each control drum assembly 124 within the ex-core radial reflector 128.

The present invention allows for the reduction in the number of control drum drive motors within each control drum system, allows for simultaneous rotation of the control drum assemblies, allows for a secondary control drum drive motor to override a primary control drum drive motor, thereby providing an independent reactor control shutdown system, and allows for a reduction in weight of space-based nuclear reactors. Note also, the previously discussed control drum systems of the present invention may also be used with terrestrial nuclear reactors such as microreactors. Microreactors are nuclear reactors that are, because of their size, able to be disposed within semi-truck trailers, shipping containers, aircraft, etc., making them a readily portable source of power. Known microreactors are capable of producing one to twenty megawatts (MW) of power.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

The invention claimed is:

1. A control drum system for a nuclear reactor including a reactor core, comprising:

an ex-core reflector including a cylindrical outer wall, a cylindrical inner wall that is concentric with the outer wall and defines a cylindrical center bore, and a plurality of cylindrical apertures disposed between the outer and inner walls;

a plurality of control drum assemblies, each control drum assembly including a drive shaft having a top end and a bottom end, a drum cylinder affixed to the bottom end of the drive shaft, and a planetary gear attached to the top end of the drive shaft, wherein the drum cylinder of each control drum assembly is rotatably received in a corresponding cylindrical aperture of the ex-core reflector;

a first control drum drive motor operably connected to the top end of a first control drum assembly of the plurality of the control drum assemblies so that the first control drum motor rotates the drum cylinder of the first control drum assembly within the corresponding cylindrical aperture of the ex-core reflector;

a second control drum drive motor operably connected to the top end of a second control drum assembly of the plurality of control drum assemblies so that the second control drum motor rotates the drum cylinder of the second control drum assembly within the corresponding cylindrical aperture of the ex-core reflector; and a divided ring gear including at least a first and a second semi-circular portion, the divided ring gear being operably connected to the planetary gear of each of the control drum assemblies.

2. The control drum system of claim 1, wherein the first and the second control drum drive motors are one of an electric motor and a pneumatically driven motor.

3. The control drum system of claim 1, wherein each planetary gear includes a corresponding set of drive teeth that are rotatably engaged with a set of drive teeth disposed on an inner surface of the at least first and second portions of the divided ring gear.

4. The control drum system of claim 1, wherein the first semi-circular portion of the divided ring gear is operably connected to the planetary gear of the first control drum assembly, and the second semi-circular portion of the divided ring gear is operably connected to the planetary gear of the second control drum assembly.

5. The control drum system of claim 1, wherein the nuclear reactor is one of a nuclear thermal space reactor and a microreactor.

6. A nuclear reactor, comprising:

a reactor core;

an ex-core reflector including a cylindrical outer wall, a cylindrical inner wall that is concentric with the outer wall and defines a cylindrical center bore, and a plurality of cylindrical apertures disposed between the outer and inner walls, the reactor core being disposed within the center bore;

a plurality of control drum assemblies, each control drum assembly including a drive shaft having a top end and a bottom end, a drum cylinder affixed to the bottom end of the drive shaft, and a planetary gear attached to the top end of the drive shaft, wherein the drum cylinder of each control drum assembly is rotatably received in a corresponding cylindrical aperture of the ex-core reflector;

a first control drum drive motor operably connected to the top end of a first control drum assembly of the plurality of the control drum assemblies so that the first control drum motor rotates the drum cylinder of the first control drum assembly within the corresponding cylindrical aperture of the ex-core reflector;

a second control drum drive motor operably connected to the top end of a second control drum assembly of the plurality of control drum assemblies so that the second control drum motor rotates the drum cylinder of the second control drum assembly within the corresponding cylindrical aperture of the ex-core reflector; and a divided ring gear including at least a first and a second semi-circular portions, the divided ring gear being operably connected to the planetary gear of each of the control drum assemblies.

7. The nuclear reactor of claim 6, wherein the first and the second control drum drive motors are one of an electric motor and a pneumatically driven motor.

8. The nuclear reactor of claim 6, wherein each planetary gear includes a corresponding set of drive teeth that are rotatably engaged with a set of drive teeth disposed on an inner surface of the at least first and second portions of the divided ring gear.

9. The nuclear reactor of claim 6, wherein the first semi-circular portion of the divided ring gear is operably connected to the planetary gear of the first control drum assembly, and the second semi-circular portion of the divided ring gear is operably connected to the planetary gear of the second control drum assembly.

10. The nuclear reactor of claim 6, wherein the nuclear reactor is one of a nuclear thermal space reactor and a microreactor.

* * * * *